F. A. LANE.
TEAT CUP FOR MILKING MACHINES.
APPLICATION FILED DEC. 6, 1909.

952,122.

Patented Mar. 15, 1910.

Witnesses.

Frederic A. Lane, Inventor.
Attorneys.

UNITED STATES PATENT OFFICE.

FREDERIC A. LANE, OF LITTLE FALLS, NEW YORK, ASSIGNOR TO D. H. BURRELL & COMPANY, OF LITTLE FALLS, NEW YORK.

TEAT-CUP FOR MILKING-MACHINES.

952,122.

Specification of Letters Patent.

Patented Mar. 15, 1910.

Application filed December 6, 1909. Serial No. 531,526.

*To all whom it may concern:*

Be it known that I, FREDERIC A. LANE, a citizen of the United States, residing at Little Falls, in the county of Herkimer and State of New York, have invented a new and useful Improvement in Teat-Cups for Milking-Machines, of which the following is a specification.

This invention relates to teat-cups which are used in milking apparatus operating by suction which is applied intermittently or in pulsations to the cups and through the latter to the teats. Teat-cups for this class of milking machines have been made of different constructions, one construction, which has been extensively used, being that which is shown in Letters Patent No. 827,160, dated July 31, 1906, granted to my assignee, the firm of D. H. Burrell & Co. The cup of that patent comprises a rigid downwardly-tapering body, having an upwardly-diverging top chamber and a flexible mouthpiece applied to the chamber.

In the use of these cups it has been necessary, in order to obtain best results, to have the tapering body of the cup fit the teat closely and in such a manner as to support the teat. When the tapering body of the cup was too large for the teat, so that the latter was not supported by the cup but hung freely therein, the milking action was imperfect and became uncomfortable for the cow, and the teat would become swollen, congested and hardened. As the teats differ considerably in size, even in the same breed of cows, it was therefore necessary to have cups of different sizes, and it was further necessary to select a cup of the proper size for each particular size of teat. The selection was often neglected altogether or improperly and unskilfully made and the result was an unsatisfactory working of the machine. In ordinary practice six different sizes of teat-cups were required to meet the ordinary variations in the size of teats, leaving out of consideration abnormally large or small teats or malformations.

The object of this invention is to overcome this difficulty and to provide a teat-cup which will work satisfactorily with large and small teats under the ordinary variations of size.

Figure 1:
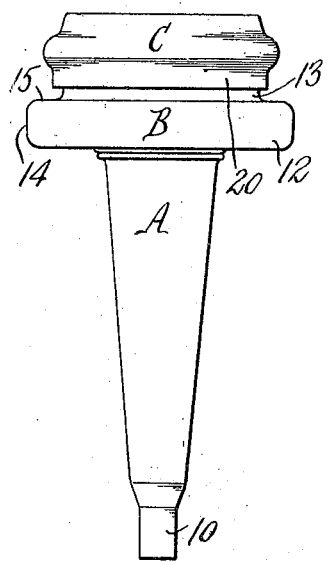
Figure 2:
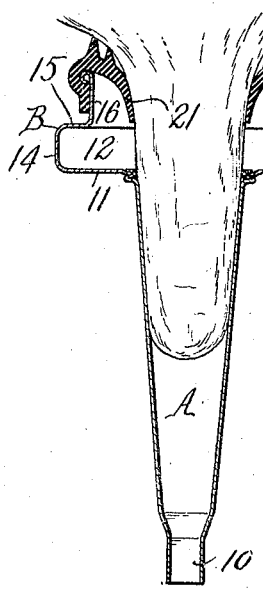
Figure 3:
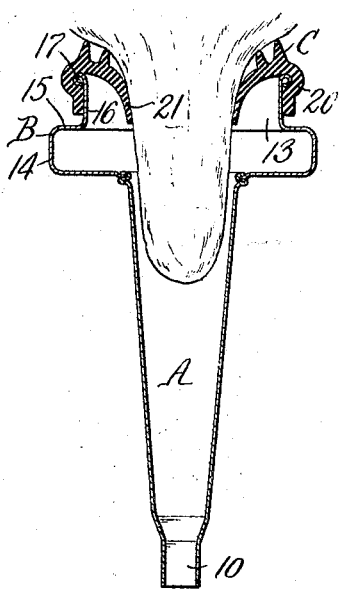
Figure 4:
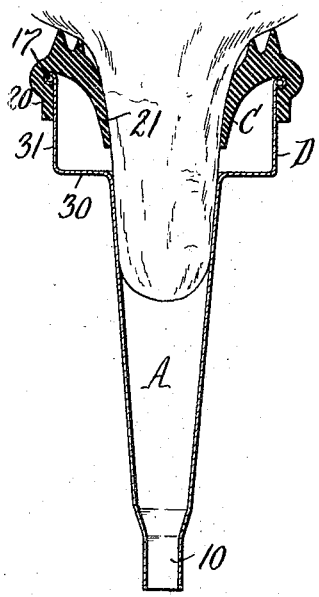
Figure 5:
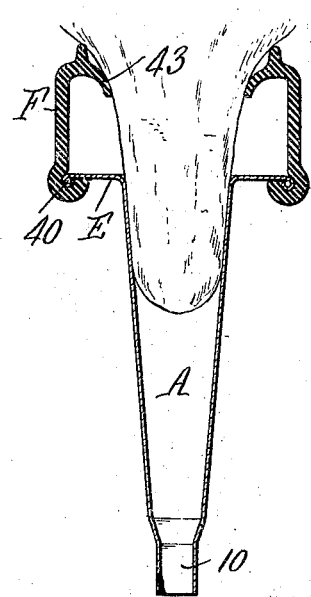
Figure 6:
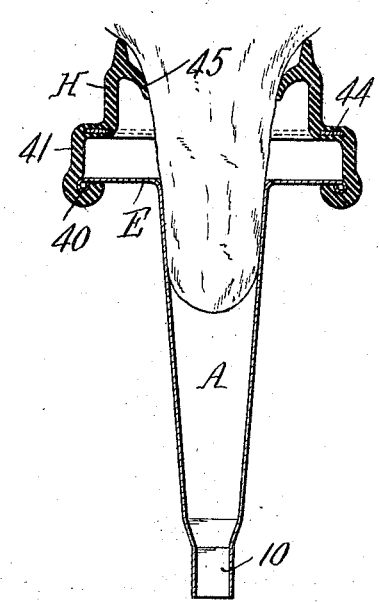

In the accompanying drawings: Figure 1 is a side elevation of the preferred construction of the teat cup. Fig. 2 is a sectional elevation thereof, showing the cup applied to a large teat. Fig. 3 is a similar view, showing the cup applied to a small teat. Fig. 4 is a sectional elevation, showing a modified construction of the cup. Fig. 5 is a sectional elevation showing a modified construction of the cup, similar in form to the one shown in Fig. 4, but with a differently designed mouthpiece. Fig. 6 is a sectional elevation of the cup, similar in form to the one shown in Figs. 2 and 3 but with a differently designed mouthpiece.

Like reference characters refer to like parts in the several figures.

A represents the downwardly tapering body of the cup, having at its small lower end a nipple 10, or a bead or other suitable provision for connection with the suction pipe of a milking machine. The form and size of the body of this cup are such that it will readily receive and comfortably fit the largest sized normal teat of a cow, while the small teats will have more or less clearance in the body of the cup. In the drawings a large teat fitting comfortably in the body of the cup is shown in Figs. 2 and 4, while a smaller teat having clearance in the cup is shown in Fig. 3.

B, Fig. 1, represents an annular enlargement or top chamber formed at or secured to the upper end of the tapering body and having its annular bottom 11 arranged approximately horizontally, or at right angles to the axis of the cup. This top chamber comprises, in the construction represented in Figs. 1-3, a lower portion 12 and an upper portion 13, the latter being of less diameter than the lower portion but of larger diameter than the body. The wall of the top chamber above the bottom 11 thereof consists of a lower peripheral portion 14, a horizontal portion 15 extending inwardly from the top of the lower portion 14, and an upper peripheral portion 16 extending upwardly from the portion 15 and having at its upper end a bead or rim 17.

The dimensions of this cup which have been found satisfactory in practice are approximately as follows: Taking the diameter of the large upper end of the body as slightly larger than one inch, the length of the body is about four times this diameter, the height of the top chamber about equal to this diameter, the diameter of the large lower portion of the top chamber about two and a half times this diameter, and the diameter of the small upper portion of the top chamber a little less than twice this diameter.

The cup is preferably made of sheet copper, tinned or nickel plated, but may be made of glass, hard rubber or other suitable material sufficiently rigid to retain its form under working conditions.

C, Figs. 1–4, represents a flexible mouthpiece of well known construction, preferably of soft india rubber, which is applied to the top chamber B by springing its outer annular attaching wall 20 over the top bead or rim 17 of the cup. This mouthpiece comprises an inner annular packing-curtain 21 which depends from the top of the mouthpiece into the cavity of the top chamber and bears against the upper portion of the teat adjacent to the udder. The mouthpiece bears snugly against the teat without exerting a harmful pressure and permits of a moderate amount of lateral as well as up and down motion, whereby the mouthpiece and the body of the cup are enabled to adapt themselves nicely to the teat.

When the teat fits the body of the cup, as represented in Figs. 2 and 4, the teat is comfortably supported in the tapering body of the cup and the milking operation proceeds without difficulty and with comfort to the cow. When the teat is normally smaller than the tapering body, or although large at first has become small due to the withdrawal of milk from the udder and teat; and when therefore there is more or less clearance between the cup and teat, as indicated in Fig. 3, the air is caused to flow back and forth along the teat by the suction pulsations. During the suction period the air is drawn out of the top chamber and flows downwardly along the teat and escapes from the lower end of the body of the cup, while during the relief period, during which air is admitted to the milk passages for relieving the vacuum, the air enters the lower end of the cup and flows upwardly along the teat and into the top chamber. The air flows back and forth in this manner along a teat which is smaller than the tapering body and practical experience has shown that in the action of the cup on the teat the arrangement of the bottom of the top chamber in a position which is approximately at right angles to the axis of the cup, or, in other words, a position which presents an abrupt change of direction at the junction of the body and chamber, is of great importance. Whether this approximately horizontal bottom acts as a deflector which directs the air current squarely against the teat, when the air is drawn out of the top chamber during the suction period and thereby eases the teat, or whether some other physiological action takes place, the fact is that the abrupt or approximately horizontal bottom of the top chamber prevents the teat from becoming congested, inflamed or hardened when smaller than the body of the cup and unsupported thereby, which result would occur in the patented construction of the cup, hereinbefore referred to, unless the cup fitted the teat properly.

The improved cup operates properly upon teats which are much smaller than the body of the cup and permits of a proper milking operation upon teats covering a considerable range of sizes, excepting abnormally large or small teats or malformations, and thereby simplifies the machine and its use greatly because this cup takes the place of about six different sizes of cups formerly employed and dispenses with the necessity of selecting a cup of the proper size.

When the curtain of the flexible mouthpiece is distended by a large teat the air space within the top chamber is considerably reduced but the lower, outwardly-projecting part of the top chamber is not affected by such crowding of the mouthpiece toward the peripheral wall of the top chamber, and a sufficient air space is maintained in the chamber by reason of this outwardly projecting lower part thereof when the cup is applied to large teats.

In the modified construction represented in Fig. 4, the bottom 30 of the top chamber D is approximately horizontal, as it is in the preferred construction, but the peripheral wall 31 of the chamber is cylindrical and not composed of two superposed sections of different diameters, as it is in Fig. 1. The diameter of the top chamber in this construction is preferably a little more than twice as large as that of the large end of the tapering body and the height of the top chamber is about three-eighths of its diameter. This construction is inferior to that represented in Figs. 1–3 because the flexible mouthpiece, when distended by a large teat, is more liable to obstruct the top chamber and reduce the air holding capacity thereof than is the case in the preferred construction in which the outwardly projecting lower portion of the top chamber is protected against obstruction by the mouthpiece.

Figs. 5 and 6 represent modified constructions, but producing nearly the forms shown in Figs. 4, 2 and 3. In each of these modified constructions the lower tapering body of the cup is provided at its large end with a substantially horizontal flange E. Over the beaded peripheral edge 40 of this flange is sprung a piece of molded rubber which forms not only the upper chamber of the cup but also the mouthpiece proper, or part that forms the air tight contact with the teat.

In Fig. 5, the rubber piece F is made sufficiently heavy, or is reinforced, so that it is practically rigid in operation, except that the curtain 43 which touches the teat must be flexible. In Fig. 6, the rubber piece H is also practically rigid when in operation, excepting the curtain 45. The stiffening of the rubber may be accomplished by the insertion of metal or cloth or by the mixing of fibrous material with the rubber. 44 represents a metal disk inserted in the rubber and serving to stiffen it.

I claim as my invention:

1. In a teat cup for milking machines, the combination of a body adapted to receive the lower portion of the teat, an enlarged top chamber forming an air space around the upper portion of the teat and having its bottom arranged substantially at right angles to the axis of the cup, and means arranged at the upper end of said enlarged chamber for making air tight connection with the teat.

2. In a teat cup for milking machines, the combination of a rigid body adapted to receive the lower portion of the teat, an enlarged top chamber forming an air space around the upper portion of the teat and having its bottom arranged substantially at right angles to the axis of the cup, and a mouthpiece arranged at the upper end of said chamber for making air tight contact with the teat.

3. In a teat cup for milking machines, the combination of a rigid body adapted to receive the lower portion of the teat, an enlarged rigid top chamber forming an air tight space around the upper portion of the teat and having its bottom arranged substantially at right angles to the axis of the cup, and a mouthpiece arranged at the upper end of said chamber and having a depending inner wall which extends from the upper end of said chamber toward the upper end of said body.

4. In a teat cup for milking machines, the combination of a rigid body adapted to receive the lower portion of the teat, an enlarged rigid top chamber forming an air space around the upper portion of the teat and having its bottom connected with the upper end of the body by an abrupt angular junction, and a mouthpiece arranged at the upper end of said chamber and having a depending inner wall which extends from the upper end of said chamber toward the upper end of said body.

5. In a teat cup for milking machines, the combination of a rigid tapering body adapted to receive the lower portion of the teat, an enlarged rigid top chamber forming an air space around the upper portion of the teat, said top chamber having its bottom arranged substantially at right angles to the axis of the cup, and a mouthpiece arranged at the upper end of said chamber and having a depending inner wall which is arranged within said air space.

6. In a teat cup for milking machines, the combination of a rigid body adapted to receive the lower portion of the teat, and an enlarged top chamber adapted to carry a mouthpiece and comprising superposed portions, the lower portion being of larger diameter than the upper portion.

7. In a teat cup for milking machines, the combination of a rigid body adapted to receive the lower portion of the teat, and an enlarged top chamber adapted to carry a mouthpiece and comprising superposed portions of different diameters, the lower portion having its bottom arranged substantially at right angles to the axis of the cup.

8. In a teat cup for milking machines, the combination of a rigid body adapted to receive the lower portion of the teat, an enlarged top chamber comprising a lower portion having its bottom arranged substantially at right angles to the axis of the cup, and an upper portion of less diameter than the lower portion, and a flexible mouthpiece carried by said upper portion.

Witness my hand in the presence of two subscribing witnesses.

FREDERIC A. LANE.

Witnesses:
GRIFFITH PRICHARD,
CHARLES B. DALZELL.